United States Patent Office 2,729,896
Patented Jan. 10, 1956

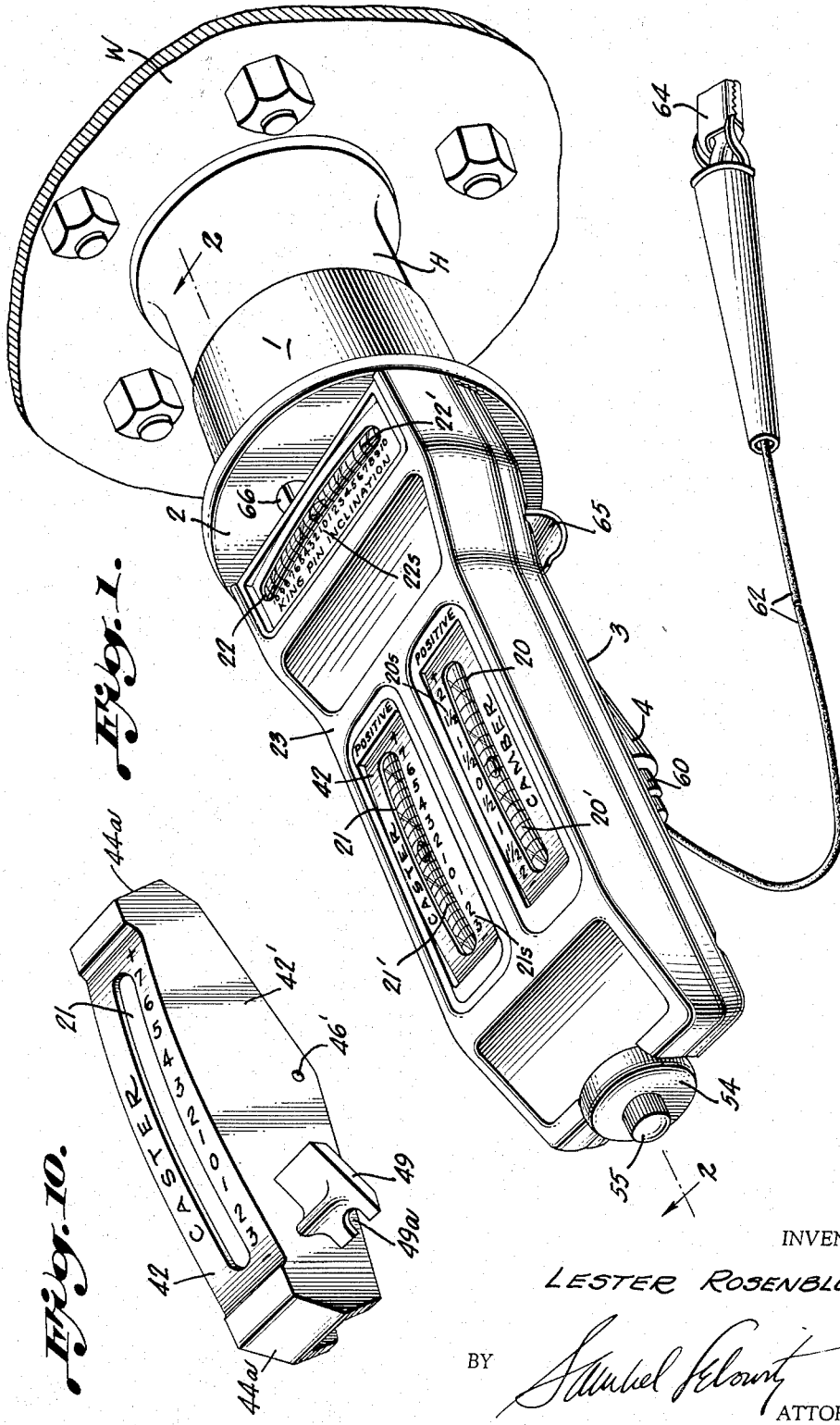

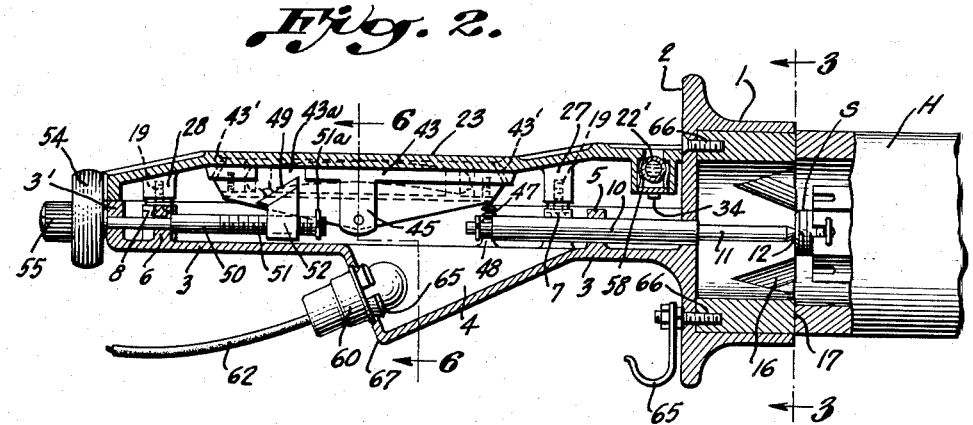
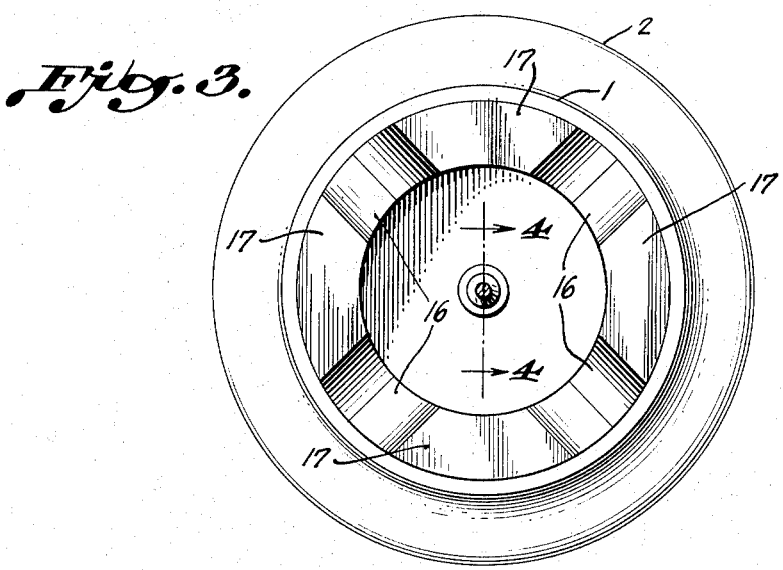
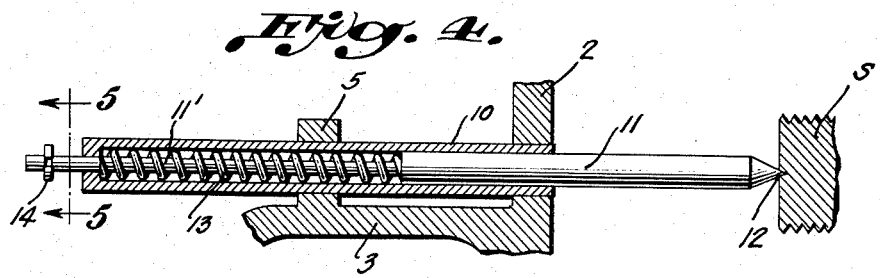
INVENTOR
LESTER ROSENBLUM
BY
ATTORNEY

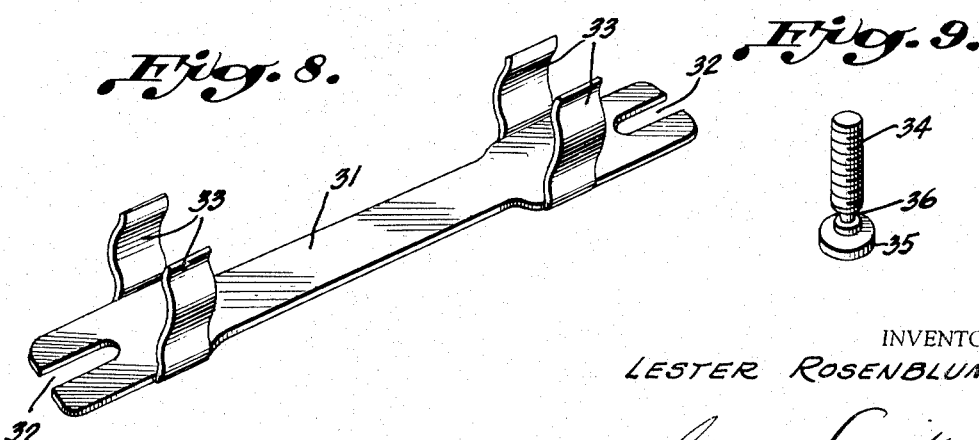

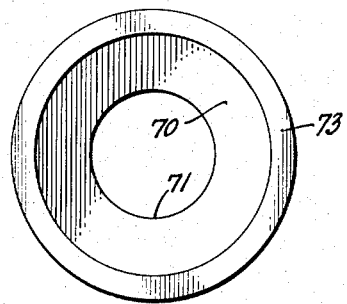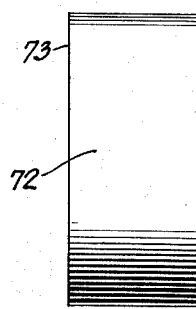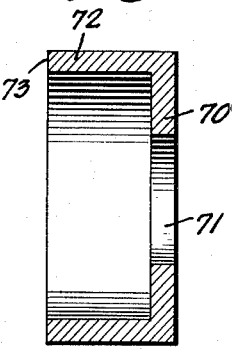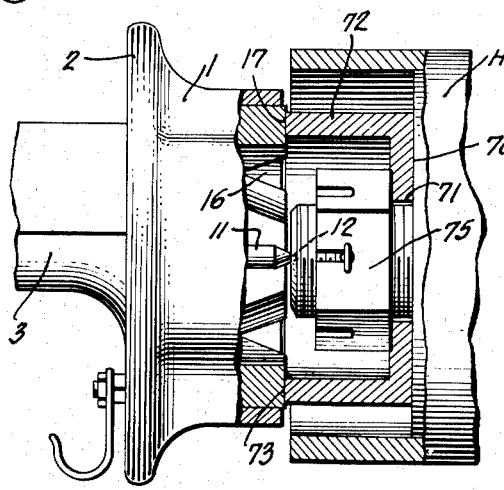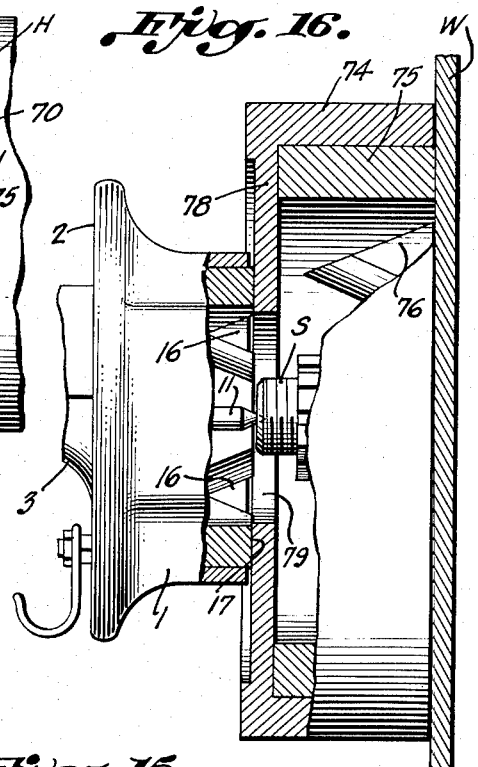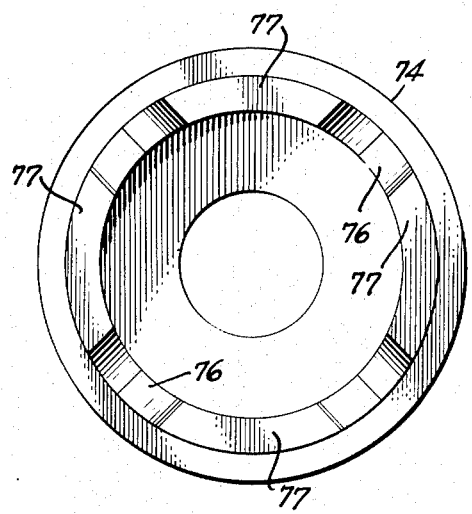

2,729,896

WHEEL ALIGNMENT GAUGE

Lester A. Rosenblum, Franklin, N. H.

Application November 18, 1952, Serial No. 321,165

3 Claims. (Cl. 33—203.18)

This invention relates to a wheel alignment gauge and more particularly to a readily portable gauge adapted to measure the camber and caster angles as well as the king-pin inclinations of vehicle wheels.

It is the object of the present invention to provide a rugged and reliable wheel alignment gauge characterized by comparatively low cost of fabrication and low maintenance costs.

It is a further object of the invention to provide a wheel alignment gauge which is capable of determining the camber and caster angles as well as king-pin inclinations of wheels accurately and rapidly. The instrument in accordance with the invention may be applied to many different types of wheel mountings, including truck wheels, which in some instances require special adapters which form parts of the instant invention.

It is another object of the invention to provide a wheel alignment gauge formed essentially of a bipartite housing of cast metal, such as aluminum, which requires a minimum amount of machining to obtain the accurate reference planes required in instruments of this type. Constituent parts of the assembly are so designed that the development of looseness and side play from wear are minimized.

Another object of the invention is to mount the critical measuring elements, constituted by the leveling vials, in the cover of the instrument easily, quickly and with a great degree of accuracy, and which setting is maintained with permanence. Should breakage of the testing vials occur, the return of only the cover to the factory for a replacement of the indicator vials is required, which results in a saving in shipping and custom duty costs.

It is a further object of the invention to provide a wheel aligning gauge embodying an illuminated housing for the leveling vials to facilitate the reading of the instrument in dark inaccessible places or in the course of testing wheels having low skirt fenders.

Another object of the invention is to provide a wheel aligning gauge which is self positioning on a wheel by virtue of an annular attaching magnet which not only exerts an attractive force on the hub of a wheel, but also functions as a reamer or smoothing tool to eliminate any burrs or rough spots thereon to assure an accurate positioning of the gauge on the wheel as a prerequisite to correct and accurate readings of the instrument.

Other objects and purposes will appear from the detailed description of the invention following hereinafter, taken in conjunction with the accompanying drawings, wherein—

Fig. 1 is a perspective view showing the tool in accordance with the invention applied to the hub of a vehicle wheel;

Fig. 2 is a longitudinal sectional view through the instrument along line 2—2 of Fig. 1;

Fig. 3 is a vertical sectional view on an enlarged scale along line 3—3 of Fig. 2;

Fig. 4 is a vertical sectional view along line 4—4 of Fig. 3;

Fig. 5 is a vertical sectional view along line 5—5 of Fig. 4;

Fig. 6 is a vertical sectional view on an enlarged scale along line 6—6 of Fig. 2;

Fig. 7 is a vertical sectional view along line 7—7 of Fig. 6, with certain parts in elevation;

Fig. 8 is a perspective view of the special clip support for the leveling vials embodied in the instrument;

Fig. 9 is a perspective view of the special bolt cooperating with the clip support of the vial mounting;

Fig. 10 is a perspective view of the special holder for the caster leveling vial;

Fig. 11 is a front elevation of the special adapter for use on truck wheels which may not have a hub similar to the conventional automobile wheel to which the gauge in accordance with the present invention may be attached;

Fig. 12 is a side elevation of Fig. 11;

Fig. 13 is a vertical sectional view of Fig. 11;

Fig. 14 shows the application of the tool in accordance with the invention to the adapter mounted upon the spindle of a truck wheel;

Fig. 15 is a front elevation of a different form of adapter to be applied to machined surfaces of wheels in order to render usable the gauge in accordance with the present invention; and Fig. 16 is a side elevation with parts in section showing the application of the tool in accordance with the instant invention to the adapter shown in Fig. 15.

The present invention contemplates the economical production of a wheel alignment gauge designed to measure the camber and caster angles and king-pin inclination of vehicle wheels. While such instruments have been used extensively heretofore, many difficulties have arisen in the setting of the leveling vials accurately according to a standard gauge, and in the maintenance of an accurate calibration of these instruments in the course of the use thereof. Also, substantial expense has been entailed in the servicing of such instruments in the course of their operation in order that they might render the accurate measurements required of them. The instant invention seeks to overcome the disadvantages of the instruments of the prior art and to incorporate several features never known heretofore in such instruments.

The housing for the three ground leveling vials for measuring the camber and caster and king-pin angles, the mountings for which vials are described in greater detail below, is formed of two parts and is preferably cast from aluminum. The housing is provided with a cylindrically-shaped head 1 having an end face 2 and from which face projects the lower housing section 3 in a direction opposite to the cylindrical head portion 1. The base is provided at its longitudinal center line with a well or depression 4 at the intermediate portion thereof to form a space for the mounting of a lamp 69, described in greater detail below, and the sides and end of the base are cupped, as shown at 3' in Fig. 6, for receiving thereover the upper housing section 23 having its front end terminating flush against the face of end wall 2 while its rear end overlies the corresponding end of the base section 3.

The lower housing section 3 is formed as a substantially symmetrical casting along the longitudinal axis of the instrument. In addition to the well 4 formed along the medial line of the housing, a post 5 is cast upwardly from the base of the housing slightly in advance of the start of the well 4 and another post 6 is cast near the rear end of the housing. A pair of aligned bosses 7 extend inwardly from the walls 3' at the forward part of the housing section and a pair of aligned bosses 8 extend inwardly from the walls 3' near the rear of the housing section. These bosses are arranged congruously to the bosses 27 at the forward end of the upper housing section 23 and to bosses 28 near the rear of the housing section 23. The ends of the eight bosses, 7, 8, 27 and 28, at the opposite sides of the housing sections, are the only surfaces which require machining in order to define the common meeting plane between the upper and lower housing sections. The four bosses 7 and 8 in the lower housing section are bored as shown at 9 (Fig. 6), while the corresponding bosses 27 and 28 in the upper section are tapped in order to accommodate bolts 19 which extend from the lower housing section into the tapped openings in the upper housing section to maintain the parts in interconnected relation with the lateral wall 23' of the upper housing section overhanging to a slight extent the lower housing section.

The wheel aligning gauge in accordance with the present invention is affixed to the hub of a wheel by means of a strong permanent magnet formed of Alnico alloy, which magnet is set into the head 1 of the housing and retained therein by means of bolts 66. Preferably the Alnico magnet is formed of a plurality of pole segments 17 having V-shaped openings 16 therebetween which present sharp edges on the end face of the magnet which are effective in cutting off any burrs or rough spots on the end of the wheel hub H when the same is affixed thereto, as shown in Figs. 1 and 2.

The tool is effectively centered with the spindle S by the provision of a brass plunger 11 having a sharpened point 12 for engagement with the center hole formed in the end of the spindle. The plunger 11 is slidably mounted in the elongated sleeve 10 which is set rigidly in aligned openings in the head 2 of the tool and the post 5 (Figs. 2 and 4). A spiral spring 13 surrounds the rear portion of the plunger 11', which rear portion is of reduced cross-section to accommodate the spiral spring within the internal bore of the sleeve 10. A C-washer 14 is seated in a groove near the end of the plunger 11' in order to prevent the ejection of the plunger 11 from the housing sleeve 10. The full length bearing for the plunger 11 afforded by the sleeve 10 assures an effective alignment of the tool with the axis of the spindle and wheels and prevents any looseness and side play resulting from wear from affecting the accuracy of the instrument readings.

The upper housing section 23 is provided with the three leveling vials required to obtain the readings of the camber and caster angles and the king-pin inclination. While the general outline of this casting is of symmetrical configuration about a longitudinal axis, the different requirements in respect to the camber and caster vials result in differences in structural arrangement, which affect the symmetry of the casting in respect to these two vials although the mounting for the cross-level vial as well as the bosses 27 and 28 are symmetrical, as explained above.

The housing 23 is provided with a slot 20 for the camber vial 20' which is formed directly in the wall of the housing. A slot 21 for the caster vial 21' is formed in a pivoted holder 42 which is seated in a correspondingly enlarged opening in the housing 23, which is delineated by downwardly extending flanges 43 of a generally rectangular outline with rounded corners.

The cross-level vial 22' for reading the king-pin inclination may be viewed through a slot 22 directly in the upper surface of the housing 23 adjacent to the forward end thereof. The slots 20, 21 and 22 are provided with scales 20s, 21s and 22s, respectively, adjacent thereto, and the housing walls thereat are formed with a curvature corresponding to the curvature of the vials which are seated thereagainst at the inner surface of the housing section, and conform to the individual radii of each level vial. These leveling vials are mounted adjacent to the undersurface of the housing and they do not protrude above the upper surface in order to exclude the possibility of breakage thereof by tools falling thereon in the course of use of the tool. When breakage of a vial does occur, it is only necessary to ship back to the factory the light upper housing section which carries all three leveling vials.

Each of the leveling vials utilizes a spring clip mounting which is illustrated in an enlarged view in Figs. 7 to 9 in respect to the mounting of the leveling vial 21' for measuring the caster angle. Similar mounting expedients are used for the mounting of the leveling vial 20' for measuring the camber angle as well as the leveling vial 22' for measuring the king-pin inclination. This support consists of a stamped metal clip with a base 31 having the ends thereof provided with slots 32, and with spring fingers 33 adjacent each end thereof for resiliently engaging the ends of ground glass vial adapted to be retained thereby. A special threaded bolt 34 is provided with a portion of reduced diameter 36 adjacent the head 35. The reduced portion of the bolt 36 is of a size engageable with the slot 32 so that when the clip 31 holding the vial 21' therein is mounted in the ends of the casting, which is suitably bored at 37 for the reception of the bolts 34, the travel of each end of the support into the casing may be controlled critically to level the instrument according to a standard at the factory. In order to impart permanence to this setting and to prevent tampering therewith, the end of the bolt with the slots 32 are surrounded by a gob of plastic sealing medium 38 such as sealing wax, plaster, a plastic synthetic resin or analogous material. After hardening of this material, the setting of the vial in the housing remains fixed. Preferably, the sealer is spread beyond the end of the bolt and fills the ends of the compartments for the leveling vials formed of confining walls or flanges therefor, as described below, and as shown in Fig. 7. The sealing material covering both ends of the vials prevents end movements thereof.

As shown in Fig. 6, the vial 20' for measuring the camber angle, the graduations of which may be seen through the slot 20 formed directly in the housing 23, is confined between two vertically extending longitudinal walls 40 and two end walls 41. The tapped openings 37 are bored in the end walls 41 for the accommodation of the bolts 34 to a predetermined extent as required by the initial calibration of the instrument.

As stated above, the ground glass vial 21' for the measuring of the caster angle of the vehicle requires a special holder for the vial which is pivotally mounted in the housing. This holder 42 is shown in Fig. 10 and is accommodated in an enlarged opening formed in the upper section housing. The opening is defined by a substantially continuous flange 43 extending from the upper surface of the housing 23 which is substantially vertical along the longitudinal edges but which is curved at the ends thereof. A pair of lugs 45 extend downwardly from the middle of the opposite sides of the flanges 43. The lateral walls 42' of the holder 42 are spaced only slightly less than the spacing between the flanges 43 and extend downwardly towards the lugs 45. Aligned openings 46' in the lateral walls 42' of the holder 42, with correspondingly aligned openings in the lugs 45 serve to mount a pintle 46 extending therethrough for the purpose of pivotally mounting the holder 42 around a transverse axis.

The external lateral wall 42' of the holder 42, adjacent to the longitudinal median of the housing, has a camming lug 49 cast integrally therewith, presenting an inclined surface for the purpose of imparting an angular movement to the holder (Figs. 2, 6 and 10). In order to permit this angular movement, the flange 43 bounding the holder 42 is cut away at 43a so that no impediment to the rocking movement of the holder will be offered thereby. The lug 49 is also provided with slot 49a to provide clearance for shaft 50 described below.

A coil spring 47 (Figs. 2, 7), which is seated in a slight depression 48 on one side of the lower housing, and which slight depression presents the only element of dissymmetry in the lower housing, tends to rock the holder 42 in a counterclockwise direction. This movement is resisted by the action of the camming lug 49 against a cam actuator 52 which is mounted on the threaded portion 51 of shaft 50 which is disposed for rotation at the rear end of the lower housing section by the mounting of this shaft in displaced bearings therefor afforded by the cupped end 3' of the lower section and the post 6 adjacent thereto. A knurled wheel 55, of small diameter, and another wheel 54, of enlarged diameter, are mounted upon the end of the shaft 50 to impart rotation thereto at a slow and rapid rate, respectively. This rotary movement is translated into rectilinear movement of the cam actuator 52 which, as it moves to the left, as shown in Fig. 2, imparts a clockwise motion to the holder 42 against the force exerted by the spring 47 operating against the end of the holder. A C-shaped metallic washer 51' at the inner end of shaft 50 limits the travel of element 52 at its inner end. No inaccuracies can develop in the caster readings as a result of wear by virtue of the plane surfaces between lug 49 and actuator 52.

The transversely disposed leveling vial 22' is seated within a compartment 58 disposed at the head end of the upper section of the housing bounded by two longitudinal walls as well as two end walls in which are threadedly mounted the bolts 34 for properly setting the clip support 31 for the vial 22' which mounting is sealed at the ends after the proper calibration of the unit as attained.

A lamp socket 60, provided with spring terminal flanges 65 is sprung into a circular opening provided in the wall 67 of the well 4 in order to illuminate the interior of the housing to facilitate the readings of the vials in poorly lighted locations. A conductor 62 extends from the lamp socket and terminates in a clip 64 which may be attached to the battery terminal to energize the lamp from this source of energy.

A supporting hook 65 may form part of the mounting of one of the bolts 66 in order to provide a convenient suspension for the light cord.

While the light source is of small capacity it is adequate to illuminate the leveling vials, since little light leaks out from the housing. This is so by virtue of the overhanging skirt 23' presented by the upper housing over the lower housing 3'. In addition, the holder 42 for the caster leveling vial is fitted so closely within the opening therefor in the upper housing section, that no leakage of light occurs at this point. The ends 44a of the holder 42 are rounded in conformity to the ends 43' of the opening flange so that while the holder is rocked relative to the housing, no light opening is presented thereat (Fig. 7).

The wheel alignment gauge in accordance with the present invention embodying a permanent magnet attaching means, is adaptable only to only those makes of wheels having hubs of predetermined dimensions, and its use is therefore limited. The gauge may be easily applied to most makes of wheels when the inner diameter of the annular magnet, as shown in Fig. 3 is 1⅞". If this dimension were smaller, there would be no clearance for the washer which sometimes protrudes beyond the hub on the front spindle of some cars. The outside diameter of the head of the cylindrical gauge must be restricted to 3⅛", else it might hit the wheel nuts on certain cars. These dimensions present limitations on the use of the gauge in the testing of the wheels on certain trucks, some of which have no machined surfaces at all on the outside of the front wheels. Some of the trucks which do have a machined surface have a spindle nut which is too large to be accommodated within the 1⅞" diameter of the annular magnet, or else the machined surface may be so large that the entire cylindrical head falls thereinto.

To cope with these special problems, and in order to make the gauge universally adaptable on all types of car wheels as well as on truck wheels, a set of adapters of different sizes may be provided for mounting on vehicle wheels of all types in order to render the gauge usable therewith.

One form of such adapter is shown in Figs. 11 to 13 and consists of a cylindrical body 72 having an annular plate 70 at one end thereof provided with a circular opening 71 for the passage of the wheel spindle therethrough. The end face 73 of the cylindrical body 72 presents a surface corresponding to the hub of a wheel to which the gauge may be applied, as clearly shown in Fig. 14. The end wall 70 is formed as a precision-machined surface which is adapted to abut against the ground surface of the outer wheel bearing cup.

The passage of the spindle through the opening 71 presents the end of the spindle in position for the centering point 12 of the gauge in cooperation with the annular surface surrounding it presented by the annulus 73, which corresponds to the end of a wheel hub.

Several different sizes of annular bodies may be provided with different sizes of openings 71 to accommodate different sizes of spindles.

In the case of large trucks of 2½ to 7 ton capacity, the machined surface of the wheel may be about 5" in diameter. Figs. 15 and 16 illustrate a second embodiment of an adapter which may be used in such cases. This adapter has an enlarged cylindrical body 74 with a permanent annular magnet 75 of Alnico alloy pressed into one end thereof. This magnet is preferably provided with V-shaped notches 76 in the end surfaces thereof to form a plurality of seating segments 77 adjacent to the machined surface of the wheel W. The sharp edges between the segments and the notches may clear foreign objects from the surface W to attain a firm seating of the adapter thereon when the adapter is given several quarter-turns on its seat. The opposite end of the cylindrical body 74 is provided with a steel or Alnico plate 78 having a circular opening of smaller diameter 79 through which may pass the spindle S. The center-hole depression in the spindle cooperates with the centering point 12 of the plunger of the wheel gauge in known manner. Thus, the instrument is adaptable to the alignment of wheels of all sizes and forms of mountings.

Method of operation

To operate the wheel alignment gauge in accordance with the invention, the customary precautions in regard to the equal inflation of the tires are taken and a turntable is wedged under the front of each front tire with corresponding wedged wooden blocks in front of the rear tires. The car is driven forwardly onto the turntables and wooden blocks, and braking power is applied to all four wheels, preferably with the use of a brake pedal jack on the foot brake pedal. The hub cap and dust cap from the front wheels are removed, preferably by the use of a special hub cap remover. The machined end of the hub flange is wiped clean and the head end of the tool is applied thereto. A slight to-and-fro rotation is imparted to the tool in order to insure a positive and accurate setting thereof, by the removal of any burrs or rough spots on the wheel hub by the cutting action thereagainst of the magnet segments separated by the V slots. The centering plunger is positioned coaxially with the wheel spindle by the engagement of the plunger point 12 within the center-hole on the end of the spindle, which insures an accurate alignment of the tool with the wheel axis. The camber angle of the wheel is checked while the turntable is set at zero and by centering the cross-level bulb 22'. The reading of the camber angle may be taken directly from the bubble appearing on the camber scale 20s which may be positive or negative depending upon the inclination of the wheel to the vertical. The opposite front wheel is checked in the same manner, and, if desired, in certain cases the camber of the rear wheels may be checked in a similar manner.

In order to check the caster angle, the locking bolts on the turntables are removed and the turntable of the wheel being checked is turned in 20° on the turntable dial. Then, both the king-pin and caster bubbles are zeroed. The gauge is leveled on leveling vial 22', followed by a leveling on vial 21'. The latter is executed by turning wheels 54 and 55, the former for a rapid movement and the latter for a slow movement, until the center of the caster bubble is at zero degrees on the scale 21s. Thereafter the front wheel is turned out in the opposite direction 20°, on the turntable dial. The bubble readings on the scales 22s and 21s are now read without further adjustment to give the king-pin inclination and the caster angle.

The same series of operations are performed on the opposite front wheel to complete the alignment tests.

The resultant readings of camber and caster angles and king-pin inclinations are compared relative to each side of the car as well as to the manufacturer's specifications to determine whether any adjustments of the wheel suspensions should be undertaken.

Upon breakage of any of the leveling vials, the upper housing section may be returned to the factory for repair and calibration. In view of the lightness of this unit, shipping costs as well as customs costs are kept at a minimum.

While I have described my invention as embodied in a specific form and as operating in a specific manner for purpose of illustration, it should be understood that I do not limit my invention thereto, since various modifications will suggest themselves to those skilled in the art without departing from the spirit of my invention, the scope of which is set forth in the annexed claims.

I claim:

1. An alignment gauge comprising a work-engaging head, a hollow compartmental body extending from the head and formed by companion housing sections including a lower supporting section secured to the head and a removable upper section accurately seated on the lower section, means on the upper section for mounting an elongate leveling vial for viewing at the upper face of said section, said means comprising an elongate opening and transverse walls at the inner face of said housing at each end of said opening, a leveling unit including a vial, said unit having mounting flanges projecting at the respective ends, means on the transverse housing wall at one end of said opening for supportively engaging one end flange of the vial unit with capacity for vertical bodily adjustment about said last-named means as a fulcrum, a threaded bore in the other transverse end wall, a slot in the corresponding end flange of the vial unit, and a threaded setting element received in said bore and having a manipulating head and an intermediate non-threaded portion passing through the vial unit end flange slot and engaging the upper and lower faces of said flange adjacent the slot for positive vertical adjustment of the vial unit pivotally about the fulcruming remote end thereof and in either direction by appropriate increments to zero the vial relative to the housing for factory setting thereof, and means to secure and block said setting against tampering.

2. An alignment gauge according to claim 1 wherein the leveling vial is carried in a view-slotted rectangular holder providing the transverse vial unit mounting walls, dependent flanges at the under face of the housing upper section spanning the holder and providing pivotal support therefor about a transverse axis, spring means urging the holder in one rotative direction about said axis, a camming member projecting laterally of the holder within the housing body, and a threaded shaft mounted in the lower housing section and having a cam actuator in cooperative engagement with the camming member for rotatably moving the holder in the opposite direction about said axis, said shaft projecting externally of the housing body and provided with rotative manipulating means.

3. A wheel alignment gauge comprising an elongate trough-like cast metal lower housing section and a companion cast metal upper housing section provided with an elongated slot in the top surface thereof extending longitudinally of said housing section, a leveling vial mounted behind said slot for indicating the camber angle of a wheel, an enlarged opening in said top surface adjacent to and paralleling said slot, a holder pivotally mounted on said upper housing section around a transverse axis below said top surface and having an elongated slot therein, a second leveling vial behind said last-mentioned slot for indicating the caster angle of a wheel, spring means tending to rotate said holder in one direction, means supported on and shiftable longitudinally of the lower housing section for rocking said holder in the opposite direction, a third elongated slot in said upper housing section extending transversely perpendicular to said first-mentioned slots, and a third leveling vial behind said third slot in a plane normal to the planes of said first-mentioned leveling vials and correlated with the caster-angle vial to give simultaneous indication of king-pin inclination.

References Cited in the file of this patent

UNITED STATES PATENTS

| 421,786 | Traut | Feb. 18, 1890 |
|---|---|---|
| 1,043,128 | Murphy et al. | Nov. 5, 1912 |
| 1,050,610 | Burdick et al. | Jan. 14, 1913 |
| 1,311,349 | Hoagland | July 29, 1919 |
| 2,000,993 | Schmidt | May 14, 1935 |
| 2,115,347 | Sutton | Apr. 26, 1938 |
| 2,177,669 | Martin | Oct. 31, 1939 |
| 2,240,807 | Shaw | May 6, 1941 |
| 2,301,769 | Babcock | Nov. 10, 1942 |
| 2,438,358 | Castiglia | Mar. 23, 1948 |
| 2,475,502 | Holmes | July 5, 1949 |
| 2,532,593 | Bender et al. | Dec. 5, 1950 |
| 2,608,000 | Castiglia | Aug. 26, 1952 |
| 2,608,368 | Bagge et al. | Aug. 26, 1952 |
| 2,628,430 | Krumm | Feb. 17, 1953 |
| 2,645,860 | Bender et al. | July 21, 1953 |

FOREIGN PATENTS

| 11,094 | Great Britain | 1905 |
|---|---|---|

OTHER REFERENCES

Publication: "Wheel Alignment Checking Unit," J. H. Bender Equipment Co., South Gate, Calif., received in Patent Office, April 9, 1949. (Copy in 33—203.2.)